United States Patent
Asai (10) Patent No.: US 7,477,231 B2
(45) Date of Patent: Jan. 13, 2009

(54) INFORMATION DISPLAY INPUT DEVICE AND INFORMATION DISPLAY INPUT METHOD, AND INFORMATION PROCESSING DEVICE

(75) Inventor: Masahiro Asai, Kanagawa (JP)

(73) Assignee: Sony Corporation, Tokyo (JP)

( * ) Notice: Subject to any disclaimer, the term of this patent is extended or adjusted under 35 U.S.C. 154(b) by 915 days.

(21) Appl. No.: 10/521,991

(22) PCT Filed: Jul. 15, 2003

(86) PCT No.: PCT/JP03/08995

§ 371 (c)(1),
(2), (4) Date: Jan. 18, 2005

(87) PCT Pub. No.: WO2004/010276

PCT Pub. Date: Jan. 29, 2004

(65) Prior Publication Data

US 2005/0248525 A1   Nov. 10, 2005

(30) Foreign Application Priority Data

Jul. 19, 2002   (JP) .............................. 2002-211114

(51) Int. Cl.
G09G 3/36   (2006.01)
(52) U.S. Cl. ...................................... 345/104; 345/168
(58) Field of Classification Search ................. 345/156, 345/104, 168, 169; 715/773
See application file for complete search history.

(56) References Cited

U.S. PATENT DOCUMENTS

| 5,389,745 | A | * | 2/1995 | Sakamoto ................. 178/18.03 |
| 7,088,340 | B2 | * | 8/2006 | Kato ........................... 345/168 |
| 2002/0022869 | A1 | * | 2/2002 | Hareyama et al. ............. 607/98 |
| 2003/0098858 | A1 | * | 5/2003 | Perski et al. ................. 345/173 |
| 2004/0080487 | A1 | * | 4/2004 | Griffin et al. ................. 345/156 |

FOREIGN PATENT DOCUMENTS

| JP | 61-194467 | 8/1986 |
| JP | 6-324806 | 11/1994 |
| JP | 7-325655 | 12/1995 |
| JP | 9-330175 | 12/1997 |
| JP | 2000-3240 | 1/2000 |

* cited by examiner

Primary Examiner—Ricardo L Osorio
(74) Attorney, Agent, or Firm—Frommer Lawrence & Haug LLP; William S. Frommer (57) ABSTRACT

An information processing device according to the invention is adapted to receive information as input. A software keyboard is assigned to part of a pressure detection panel (4) for key arrangement and only markers are normally displayed in a display (3) to indicate the home position (reference position) of the software keyboard. Characters can be input to the character input section that is displayed on the display (3) by way of the software keyboard without using input devices such as mouse and hardware keyboard.

13 Claims, 11 Drawing Sheets

INFORMATION DISPLAY INPUT DEVICE AND INFORMATION DISPLAY INPUT METHOD, AND INFORMATION PROCESSING DEVICE

TECHNICAL FIELD

This invention relates to an information display/input device, an information display/input method and an information processing device. More particularly, the present invention relates to an information display/input device and an information display/input method that allow input operations to be conducted efficiently as well as to an information processing device to which the information display/input method is applied.

This application claims priority of Japanese Patent Application No. 2002-211114 filed on Jul. 19, 2002, the entirety of which is incorporated herein by reference.

BACKGROUND ART

Conventionally, standalone type keyboards (hardware keyboards) are being widely used as means for inputting characters into computers. However, in recent years, there have been situations where it is not possible to arrange a hardware keyboard as a result of that downsized electronic devices have become very popular, that the configuration and the operating environment of electronic devices have changed remarkably and that the design and the functionality of electronic devices have become relatively important. Additionally, as multi-functional electronic devices have become popular, input operations using only key buttons cannot cope with the multi-functionality of devices.

So-called contact input/detection techniques of directly touching icons and graphic images being displayed on the display (screen) of electronic device have effectively been used as input interface in addition to the use of hardware keyboards.

With contact input/detection, a pressure detection means is arranged on the display panel such as LCD (liquid display device) panel and keys are displayed on the display for inputting characters so that, as the user touches the display screen by means of a finger tip or an input pen, the pressure detection means detects it as pressure signal and selects the key that corresponds to the touched position of the display.

In the case of an electronic device such as a personal computer or a television receiving set having a relatively large display, however, the contact input/detection arrangement imposes a considerable load on the user because the user is forced to move the operating hand and the eyes to a large extent to contact and select an icon displayed on the display. Particularly, when an input pen is used, the user has to select each character to be input from the group of characters being displayed on the display and move the pen tip to touch the characters one by one on the display. Then, the efficiency of input operation may remarkably fall if compared with the input operation using a keyboard.

Additionally, there have been developed techniques with which the user writes characters or words on the display by means of an input pen and the device recognizes the written characters. However, it takes time for the electronic device to accurately recognize the written characters. In other words, the input efficiency of such a technique is as poor as the contact input/detection arrangement.

The input efficiency can be improved to provide the user with a multiple choice arrangement. For example, if the user writes "a", the display screen may display "about", "alone", "at home", "another" and other candidate words for the written "a" so that the user may select the right word he or she is trying to input form these candidate words. Such an input support function can be realized by means of software. However, the load imposed on the user is not remarkably alleviated because the user is required to repeat a sequence of operation of selecting the right word from the candidate words, moving the pen tip to the right word and making it touches the display.

A software keyboard that is operated by two hands like a hardware keyboard may be displayed on the display. However, then a considerable part of the display is occupied to display the software keyboard to annoy the user. Additionally, while the keyboard operation may be facilitated to the user, the problems relating to input operations remain unsolved because the display area becomes narrow.

DISCLOSURE OF THE INVENTION

Therefore, it is an object of the present invention to provide a novel information display/input device, a novel information display/input method and a novel information processing device that can dissolve the above identified problems of the prior art.

Another object of the present invention is to provide an information display/input device, an information display/input method and an information processing device that can improve the input efficiency and alleviate the load of operation on the part of the user without significantly occupying the display screen.

In an aspect of the present invention, the above objects and other objects of the invention are achieved by providing an information display/input device comprising: a display means for displaying image information and/or character information; a pressure detection means arranged on the surface of the display means to detect the pressure applied to and the spot of pressure application on the display means; and a display/input control means for reflecting the signal detected by the pressure detection means to the selection of the image information being displayed on and/or the input of characters to the display means; the display/input control means being adapted to assign virtual input keys to be used to input characters to part of the pressure detection means for key arrangement and display only markers indicating reference positions of the virtual input keys on the display means.

The display/input control means operates in a manner as described below. The display/input control means is adapted to alter the positions to which the virtual input keys are assigned according to the positions where the markers are being displayed. When pressure is not detected by the pressure detection means for a predetermined period of time, the display/input control means makes the virtual input keys translucent and visibly displays them. When pressure is detected continuously for a predetermined period of time on any of the virtual input keys, the display/input control means makes the virtual input keys invisible except the markers. The display/input control means is adapted to assign the virtual input keys to the pressure detection means with dimensions corresponding to the gap separating the markers and alter the key size of the virtual input keys to make it similar to the marker intervals.

When a mechanical keyboard is arranged, a signal conversion means is provided to convert the input signal from the mechanical keyboard and the input signal from the virtual input keys into a common keyboard signal.

In another aspect of the invention, there is provided an information display/input method for a graphic user interface for contact inputs to the display means of an information display/input device comprising a display means for displaying image information and/or character information and a pressure detection means arranged on the surface of the display means to detect the pressure applied to and the spot of pressure application on the display means, the method comprising: a display/input control step of reflecting the signal detected by the pressure detection means to the selection of the image information being displayed on and/or the input of characters to the display means; virtual input keys to be used to input characters being assigned to part of the pressure detection means for key arrangement and only markers indicating respective reference position of the virtual input keys being displayed on the display means in the display/input control step.

The information display/input method is adapted to perform control operations in a manner as described below. The positions to which the virtual input keys are assigned are altered according to the positions where the markers are being displayed. When pressure is not detected by the pressure detection means for a predetermined period of time, the virtual input keys are made translucent and visibly displayed. When pressure is detected continuously for a predetermined period of time on any of the virtual input keys, the virtual input keys are made invisible except the markers. The virtual input keys are assigned to the pressure detection means with dimensions corresponding to the gap separating the markers and the key size of the virtual input keys are altered to make it similar to the marker intervals.

In still another aspect of the invention, there is provided an information processing device comprising: a display/input section having a display means for displaying image information and/or character information and a pressure detection means arranged on the surface of the display means to detect the pressure applied to and the spot of pressure application on the display means; and a display/input control means for reflecting the signal detected by the pressure detection means to the selection of the image information being displayed on and/or the input of characters to the display means, the display/input control means assigning virtual input keys to be used to input characters to part of the pressure detection means for key arrangement and displaying only markers indicating respective reference position of the virtual input keys on the display means.

The other objects and the specific advantages that the present invention provides will become apparent from the detailed description of the present invention given below by referring to the accompanying drawings.

BEST MODE FOR CARRYING OUT THE INVENTION

Now, the present invention will be described in greater detail by referring to the accompanying drawings that illustrates an embodiment of information processing device according to the invention. The information processing device is an information display processing and information input processing device that provides a graphic user interface realized by assigning a key arrangement of a virtual input keyboard (to be referred to software keyboard hereinafter) to part of the pressure detection means arranged on the surface of the display (screen) for displaying image information and/or character information and designing the display so as to display only markers indicating only reference positions (home positions) of the virtual input keys of the virtual input keyboard. With the above-described arrangement, the problem of the prior art that the display area of display is largely occupied by a software keyboard that provides a good input efficiency is dissolved.

Figure 1:
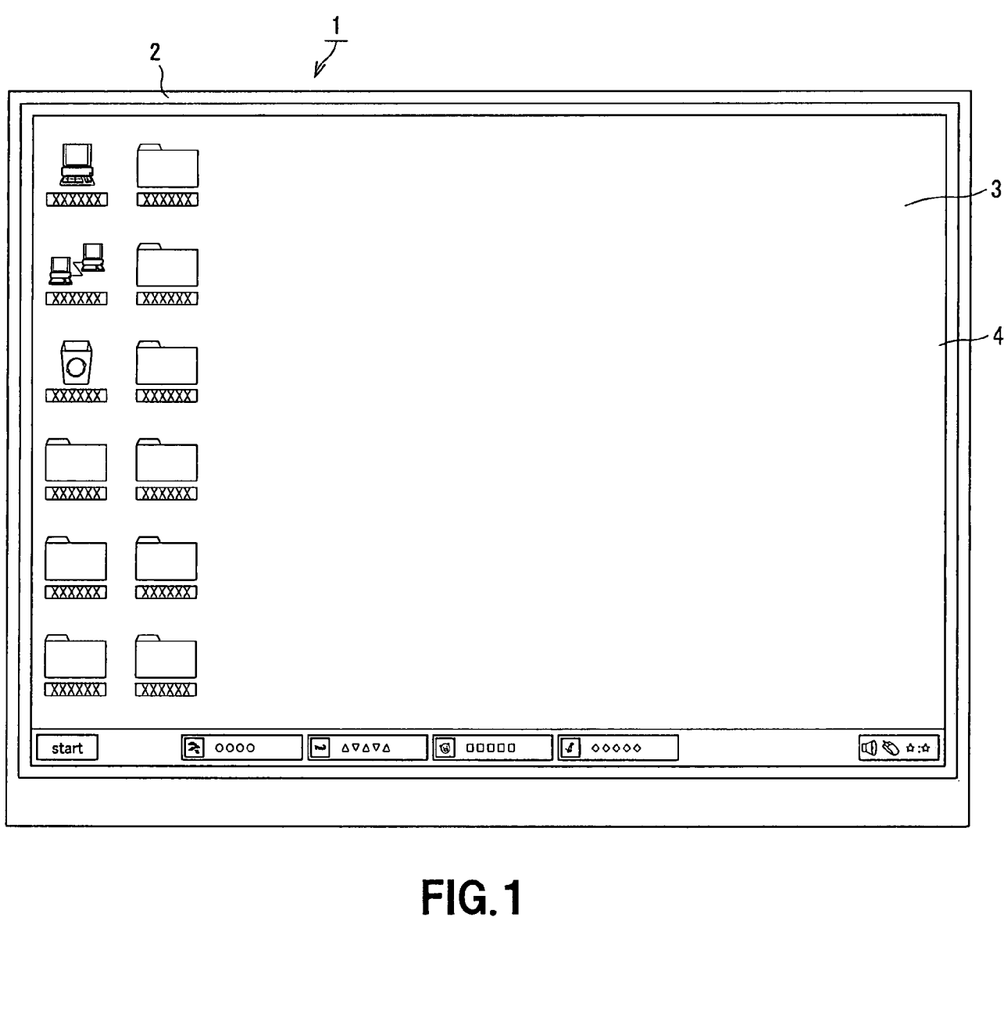
FIG. 1 is a schematic plan view of an information processing device to which the invention is applied.

Referring to FIG. 1 illustrating an information processing device 1 to which the invention is applied, the device comprises a display 3 arranged on the front side of a main body cabinet 2 and a pressure detection panel 4 is arranged on the display 3 to detect the pressure applied to the display 3.

The display 3 is typically an LCD (liquid crystal display) that is adapted to a so-called graphic user interface (to be referred to as GUI hereinafter) that provides ease of operation and is highly capable of conveying information to the user by using a variety of visual elements. When the display 3 is driven for application software, it is possible for the user to execute the software by selecting tool buttons that are designed to match the ongoing operation and displayed on the screen without being required to use complex menus and commands.

The pressure detection panel 4 is a transparent and sheet-shaped contact detection device provided with a grid of pressure sensing points. The pressure detection panel 4 can detect all the pressure sensing points to which pressure is applied simultaneously. An interface is formed by laying the pressure detection panel 4 on the display 3 so that the user can directly select any of the icons being displayed on the display 3 by simply touching it by a finger tip or an input pen.

The information processing device 1 is also provided with a connection terminal so that an ordinary hardware keyboard 7 can be connected to it. Alternatively, the information processing device 1 may be provided with a hardware keyboard as component thereof so that the user may use either or both of the pressure detection panel 4 and the hardware keyboard 7 for input operations.

Figure 2:
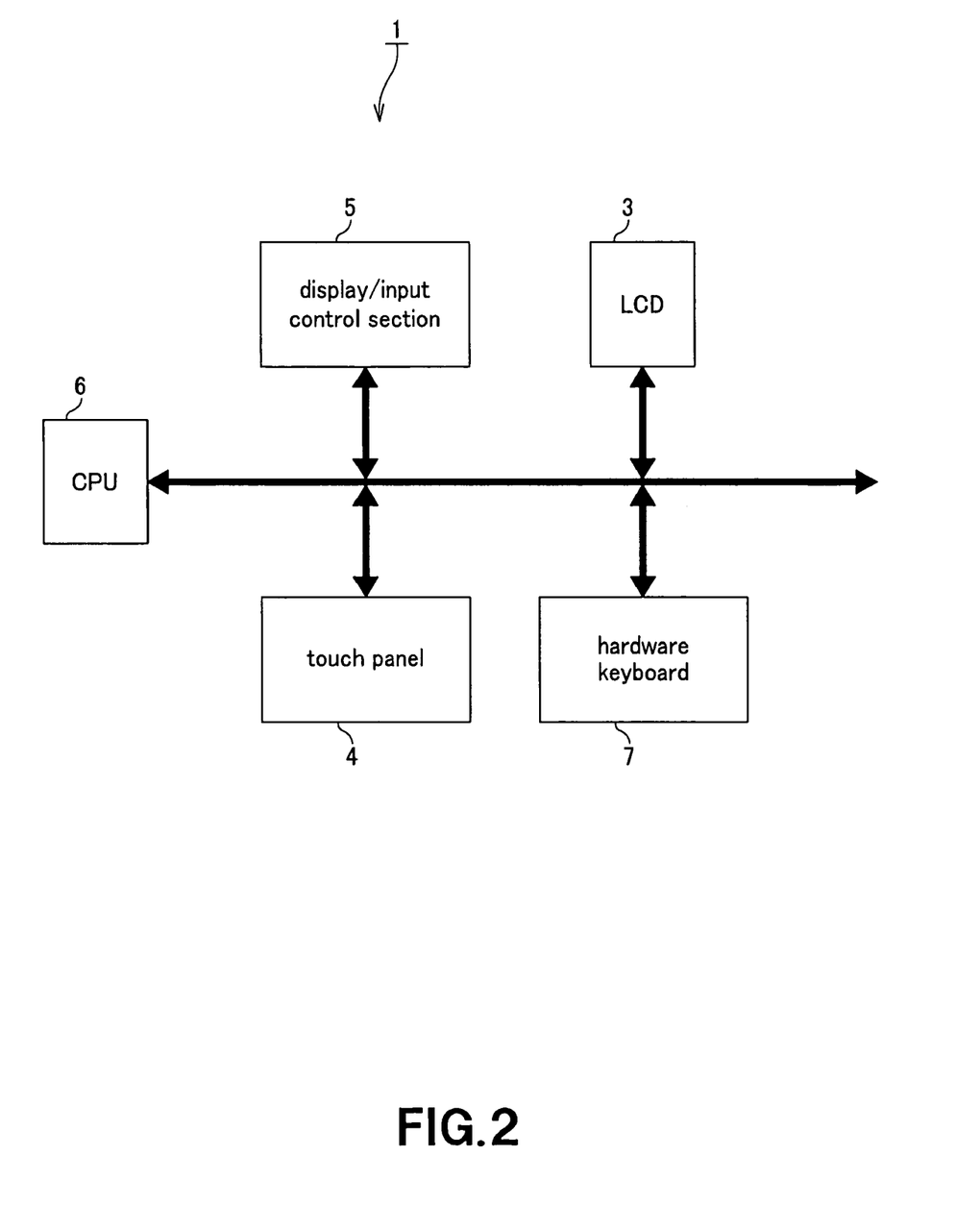
FIG. 2 is a schematic block circuit diagram of the information processing device, illustrating the internal configuration thereof.

FIG. 2 illustrates the internal configuration of the information processing device 1. The information processing device 1 comprises a display 3 realized by using an LCD, a pressure detection panel (touch panel) 4 and a display input control section 5 as principal components thereof, which are comprehensively controlled by a CPU (central processing unit) 6.

The display input control section 5 takes the role of controlling the GUI constituted by the pressure detection panel 4 and the display 3. It generates a cursor to reflect the pressure signal detected by the pressure detection panel 4 and the display of the detected position on the display 3 and executes application by selecting any of the tool buttons and the radio button displayed on the display 3.

In particular, the display input control section 5 assigns the arranged keys of software keyboard to part of the pressure detection panel 4 and processes the characters input to the character input section by way of the software keyboard. Normally, only the markers showing home positions (reference positions) of the keys of the software keyboard are displayed on the display 3. Therefore, in the following description of this embodiment, the software keyboard will be referred to as "undisplayed software keyboard" or "unvisualized software keyboard".

Thus, it is possible for the user of the information processing device 1 to conduct input operations by using the information display screen of the display 3 without using any input devices such as a mouse and a hardware keyboard due to the provision of the display input control section 5.

Figure 3:
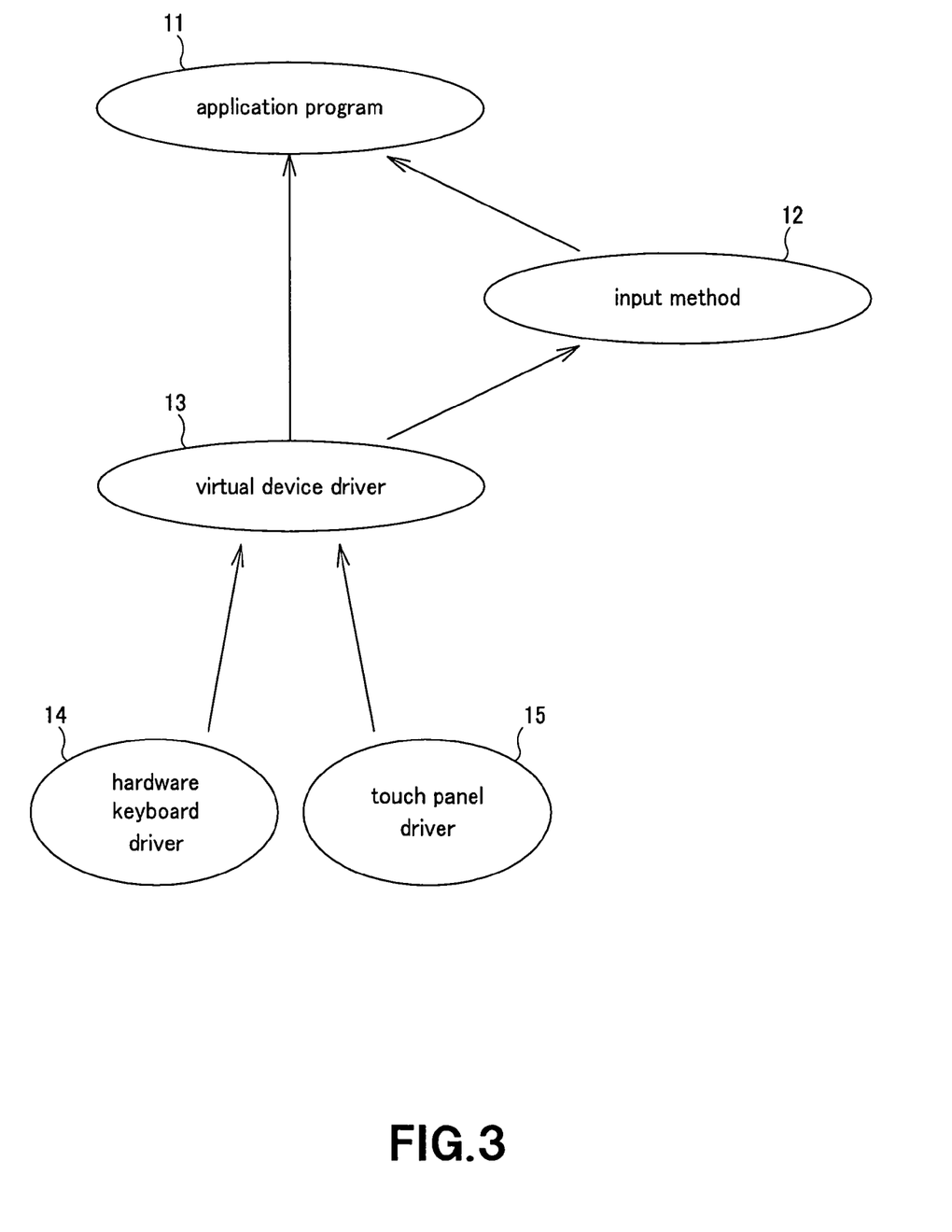
FIG. 3 is a schematic illustration of the software configuration of the control program of the information processing device.

FIG. 3 is a schematic illustration of the software configuration of the control program of the information processing device. The control program is stored in a flash ROM (not shown) or the like and read out when power is initially supplied to the information processing device 1.

The control program comprises an application program 11 that takes an upper layer, an input method 12 and a virtual device driver 13 that take a middle layer and a hardware keyboard driver 14 and a touch panel driver 15 that take a lower layer.

The application program 11 is software for preparing and editing sentences, for example. The input method 12 is used for input conversions of converting the input Romaji (Roman character) into Kana (Japanese Kana character) when Japanese is used for input operations. The input from the hardware keyboard is processed by the hardware keyboard driver 14 and the input from the software keyboard is processed by the touch panel driver 15.

Since ordinary information processing devices do not comprise a virtual device driver 13, the input from the hardware keyboard or the touch panel is directly entered to the application program or the input method. This information processing device 1, on the other hand, comprises a virtual device driver 13 that unifies the signal types coming form the keyboards to the application program 11 so that it is not necessary for the application program 11 of the upper layer to discriminate the input signal from the hardware keyboard and the input signal from the software keyboard. In other words, the input from the software keyboard is handled just like the input from the hardware keyboard by the internal application program 11. Therefore, the designer, or the developer, of the application program 11 can enjoy the advantage of being uninfluenced by the difference of keyboard type.

Figure 4:
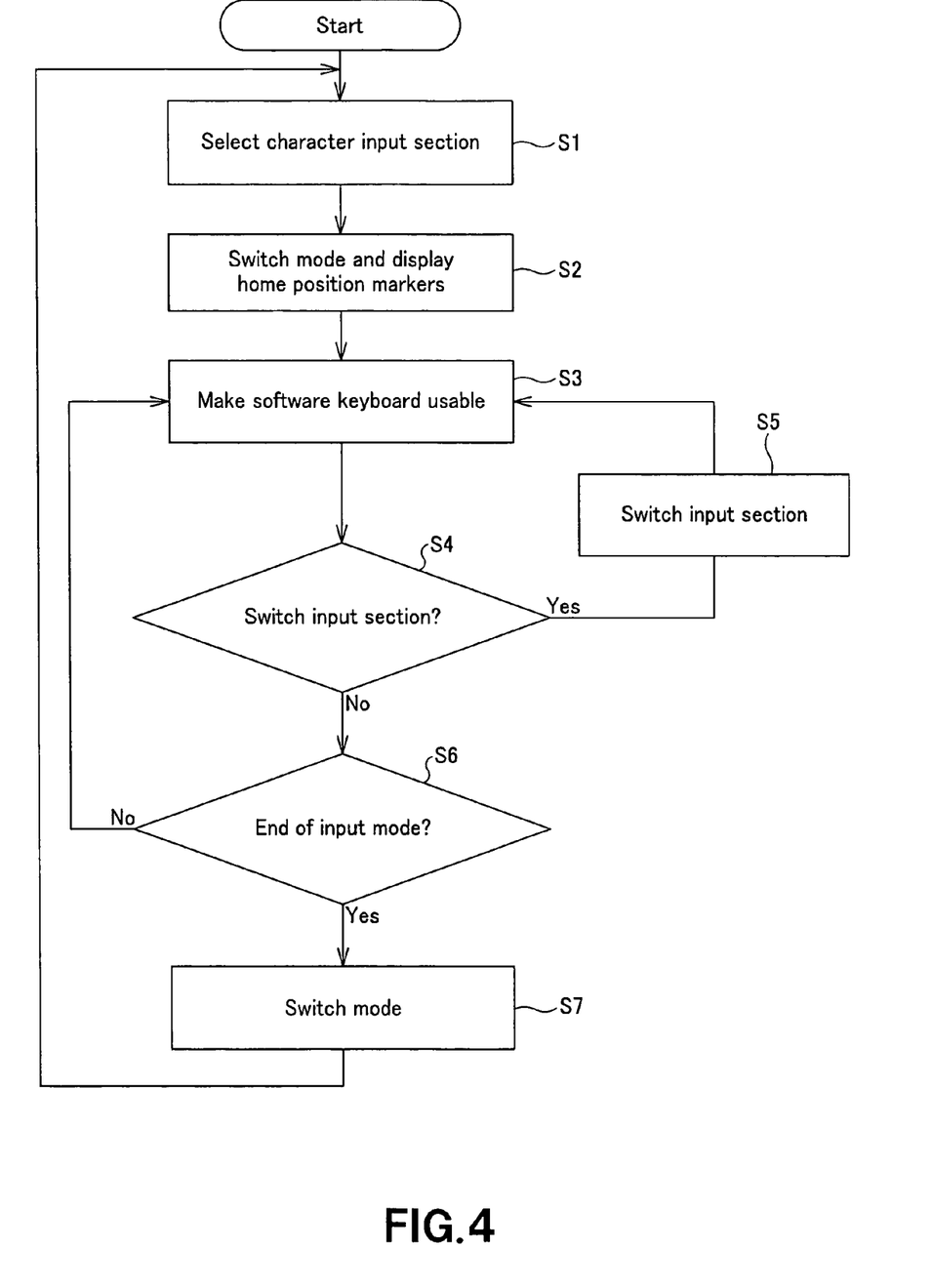
FIG. 4 is a flowchart of the processing operation for switching from an image element selection mode to a key input mode.

Now, the display/input operation of the information processing device 1 according to the invention will be described by referring to the flow chart of FIG. 4.

The information processing device 1 operates either in an image element selection mode in which the user directly select (touch) any of the visual elements such as icons and buttons that are displayed on the display 3 in order to make the device 1 display information and/or input data or commands and a key input mode in which the user input characters by way of the software keyboard. In the key input mode, the pressure signal generated as the user touches the display 3 is converted into key input information and conveyed to the application program 11.

Now, the input processing operation using the undisplayed software keyboard in the image element selection mode and also in the key input mode will be described below. Assume here that the image element selection mode is switched to the key input mode.

Figure 5:
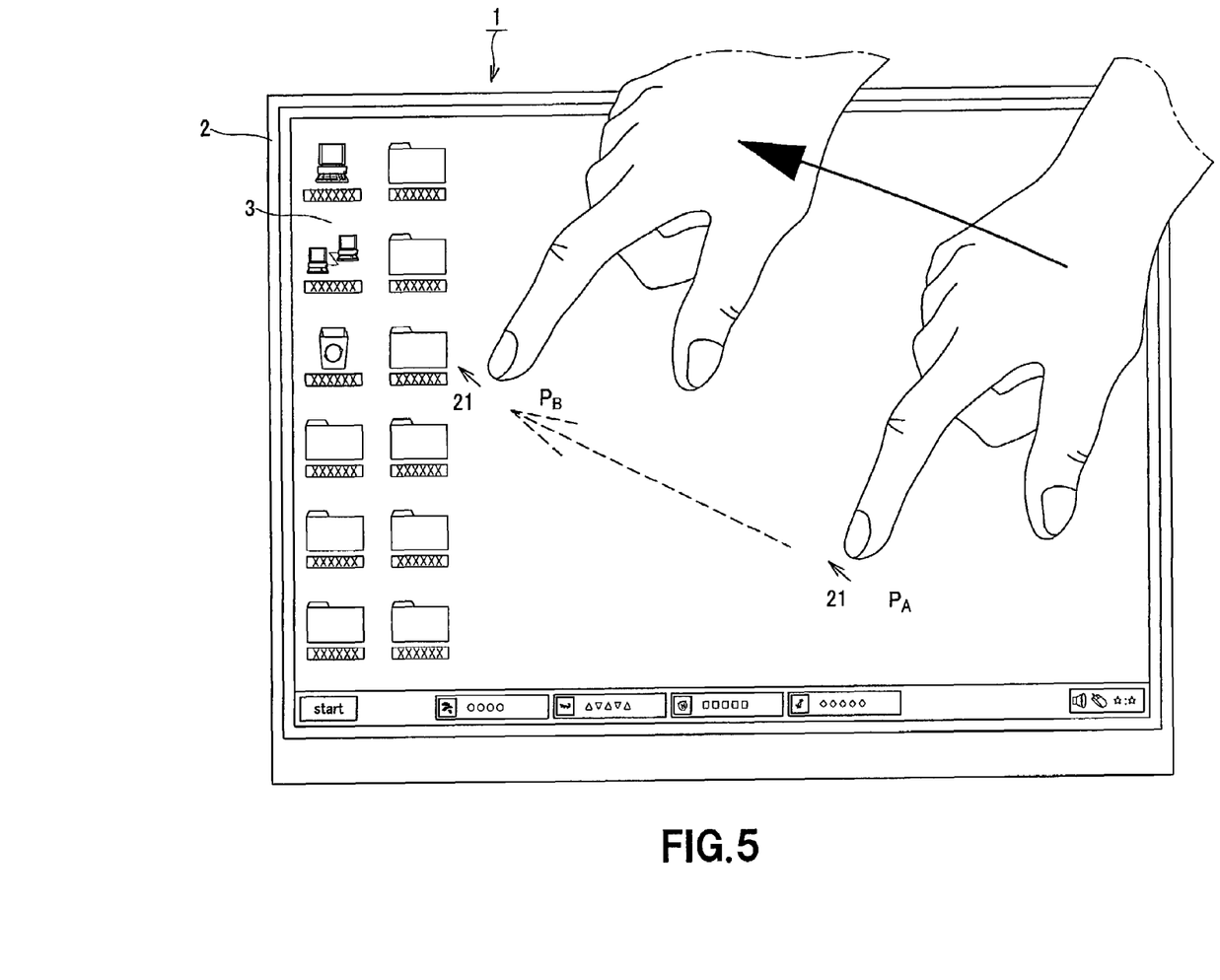
FIG. 5 is a plan view of the display of the information processing device when a character input section is selected in an image element selection mode.

FIG. 5 is a schematic illustration of the display 3 of the information processing device 1, schematically showing an input/detection in an image element selection mode. In the image element selection mode, a cursor 21 is displayed at the position where the user touches the display screen by a finger tip. As the user touches the display 3 by means of a finger tip and moves it from position PA to position PB, just as he or she does when operating a mouse, the cursor 21 moves from the position PA to the position PB of the display 3 to follow the movement of the finger tip.

Figure 6:
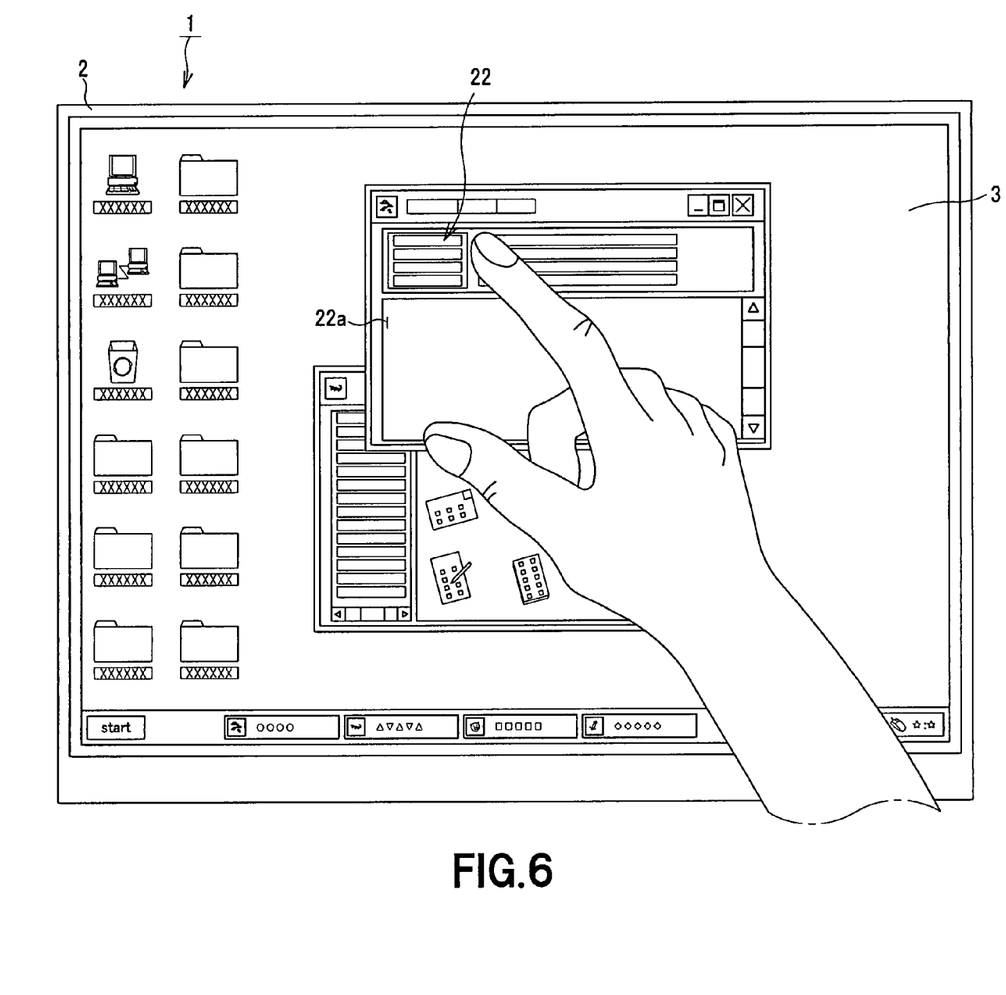
FIG. 6 is a plan view of the display of the information processing device when markers are displayed in the display in a key input mode.
Figure 7:
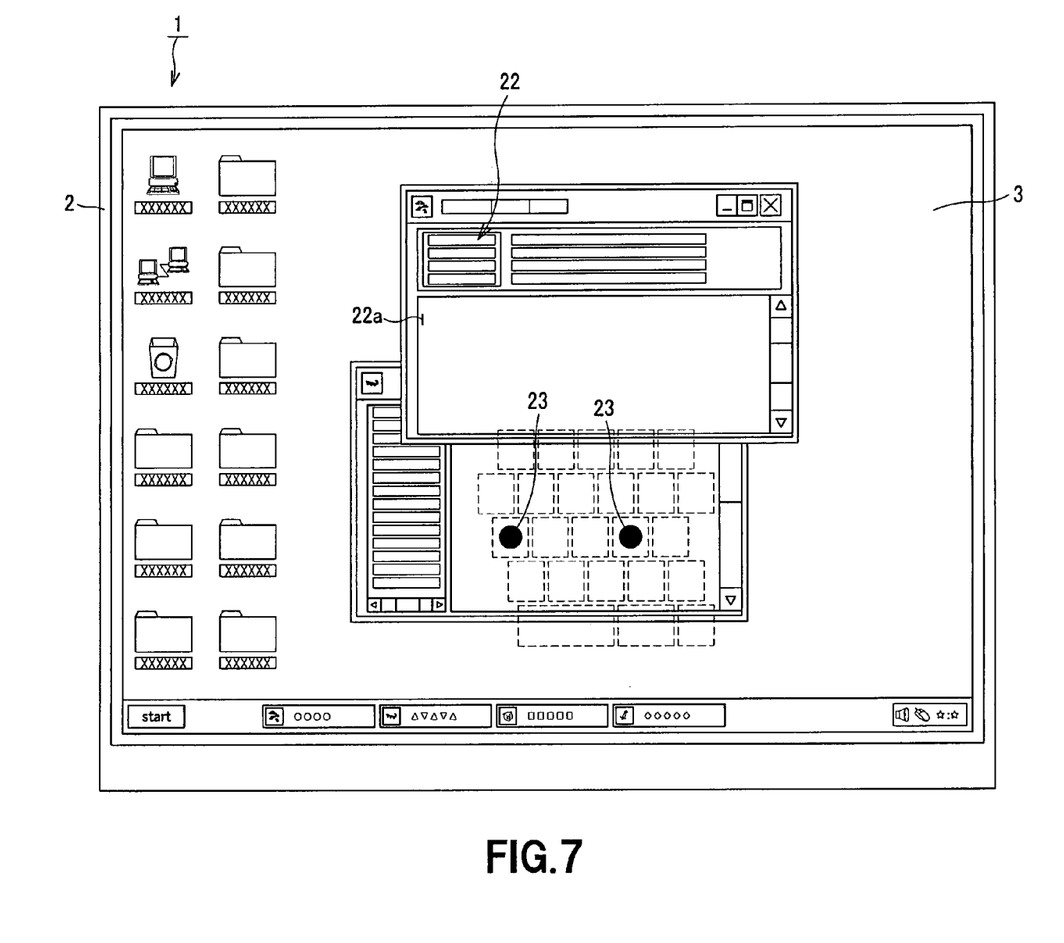
FIG. 7 is another plan view of the display of the information processing device when markers are displayed in the display in a key input mode.

Then, as the character input section 22 is selected as shown in FIG. 6 (Step S1), the image element selection mode is switched to the key input mode and markers 23 indicating the respective home positions of the undisplayed software keyboard (virtual keyboard) are displayed on the display section 3 as shown in FIG. 7 (Step S2). As a result, the unvisualized software keyboard becomes operational (Step S3). Then, the user can input characters in the character input section 22, using the undisplayed software keyboard that is assigned to the display 3 by using the makers as reference points just as he or she does when using an ordinary hardware keyboard. Note that the undisplayed software keyboard is indicated by broken lines for the purpose of illustrating it.

The software keyboard can also be used when a plurality of character input sections exist on the display 3 and the cursor is switched from an input section to another input section (Step S4). For example, a TAB key may be used for the switching operation. As the position that corresponds to the TAB key as determined by referring to the markers 23 is touched, the character input section 22 is switched to the character input section 22a (Step S5).

The key input mode can be terminated also by using the undisplayed software keyboard. For example, as pressure is detected at the position that corresponds to the enter key as determined by referring to the markers 23 (Step S6), the key input mode ends and switched back to the image element selection mode (Step S7). When the character input section is selected again in the image element selection mode, the processing operation starting from Step S1 is repeated.

A GUI is generally an interface constituted by icons and a mouse. However, with a GUI having the above described configuration, an input operation can be performed by directly touching the display 3 without relying on any input device comprising a mouse and a keyboard. Additionally, since only the markers showing the reference positions (home positions) of the software keyboard are displayed on the display 3, the disadvantage of the prior art that part of the information being displayed on the display is hidden by the software keyboard is eliminated.

While the software keyboard is made invisible and only the markers 23 of the virtual keyboard are displayed immediately after the key input mode is selected in the above described Steps S2 and S3, it is also possible to make the display 3 display the software keyboard by way of a predetermined operation. Various techniques can be used to make the software keyboard invisible (or visible).

For example, the software keyboard may be translucently displayed immediately after the selection of the key input mode so that the information being displayed on the display 3 may not be hidden, made gradually inconspicuous when pressure is detected on the software keyboard continuously for a certain period of time and completely reduced invisible except the markers 23 after the elapse of a predetermined period of time.

Alternatively, it may be so arranged that the undisplayed software keyboard comes to be displayed when no key input operation is conducted for a predetermined period of time even after the software keyboard is reduced invisible. At this time, the software keyboard is displayed translucently so that the information being displayed on the display 3 may not be hidden by the software keyboard.

It is possible to change the size, the angle and the key bind of the software keyboard according to the size of the user's hands and the inter-digital distances of the user's hands. In other words, they are controlled by the display input control section 5 and the position of arrangement of the virtual keyboard on the pressure detection panel 4 on the screen can be modified appropriately.

Figure 8:
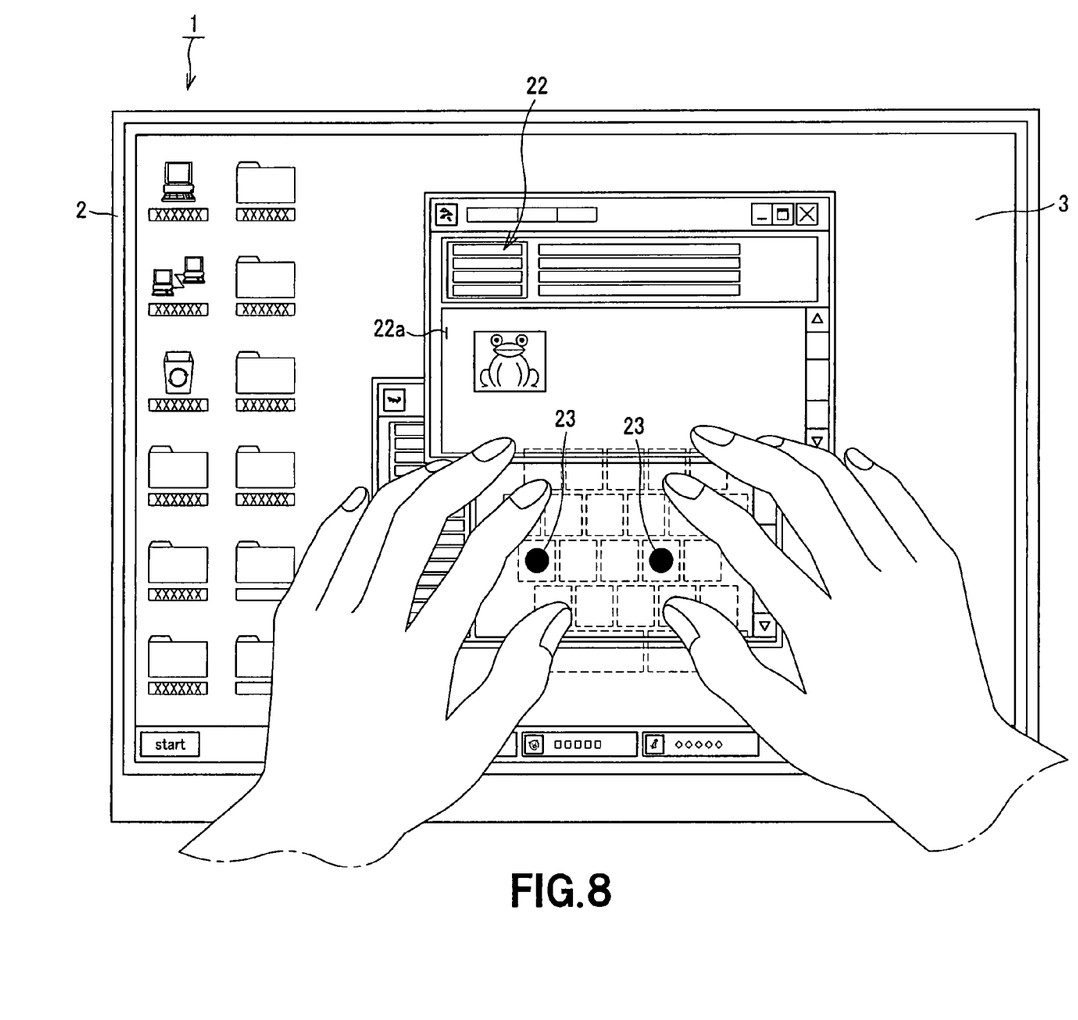
FIG. 8 is a plan view, showing the arrangement of marker and keys.
Figure 9:
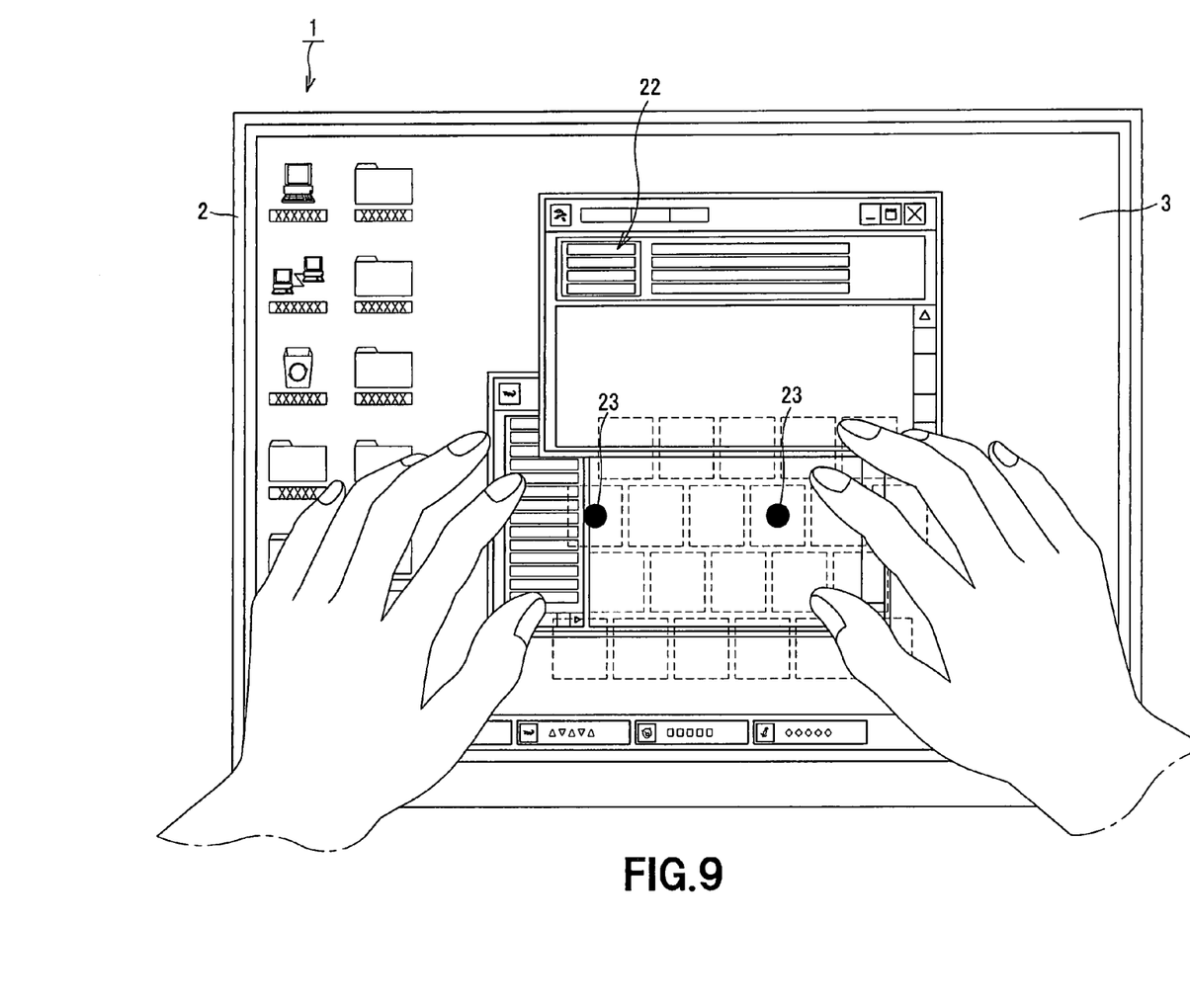
FIG. 9 is a plan view, showing how the interval between the group of keys to be operated by the left hand and the group of keys to be operated by the right hand of the user is altered by changing the positional relationship between the markers.

Specific examples of technique for modifying the area to which the undisplayed software keyboard is assigned include one adapted to shift the markers 23 indicating the home positions on the display 3 to change the positional relationship between the markers 23. To begin with, the keys are arranged as indicated by broken lines with the gap separating the markers as shown in FIG. 8. As the user touches the markers 23 to increase the gap separating the markers, the software keyboard is expanded corresponding to the gap separating the markers as shown in FIG. 9.

With the above described information processing device 1, therefore, it is possible to alter the area to which the software keyboard is assigned in the pressure detection panel 4 according to the gap separating the markers 23 and by referring to the positions of the moved markers 23.

It is also possible to change the gap between the group of keys to be operated by the left hand and the group of keys to be operated by the right hand by changing the positional relationship between the markers 23 in the above described manner.

Figure 10:
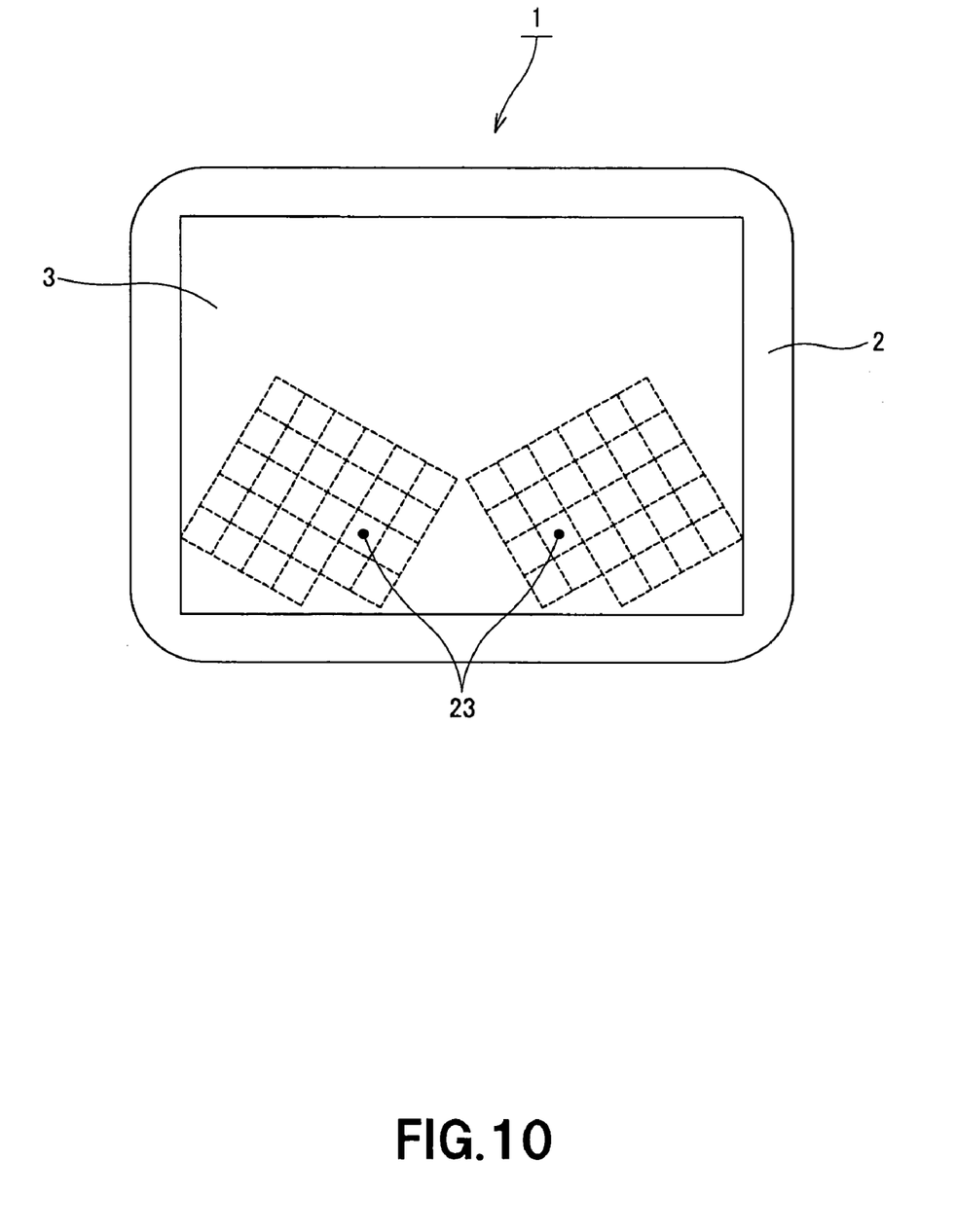
FIG. 10 is a plan view, showing the angle between the two groups of keys are modified.
Figure 11:
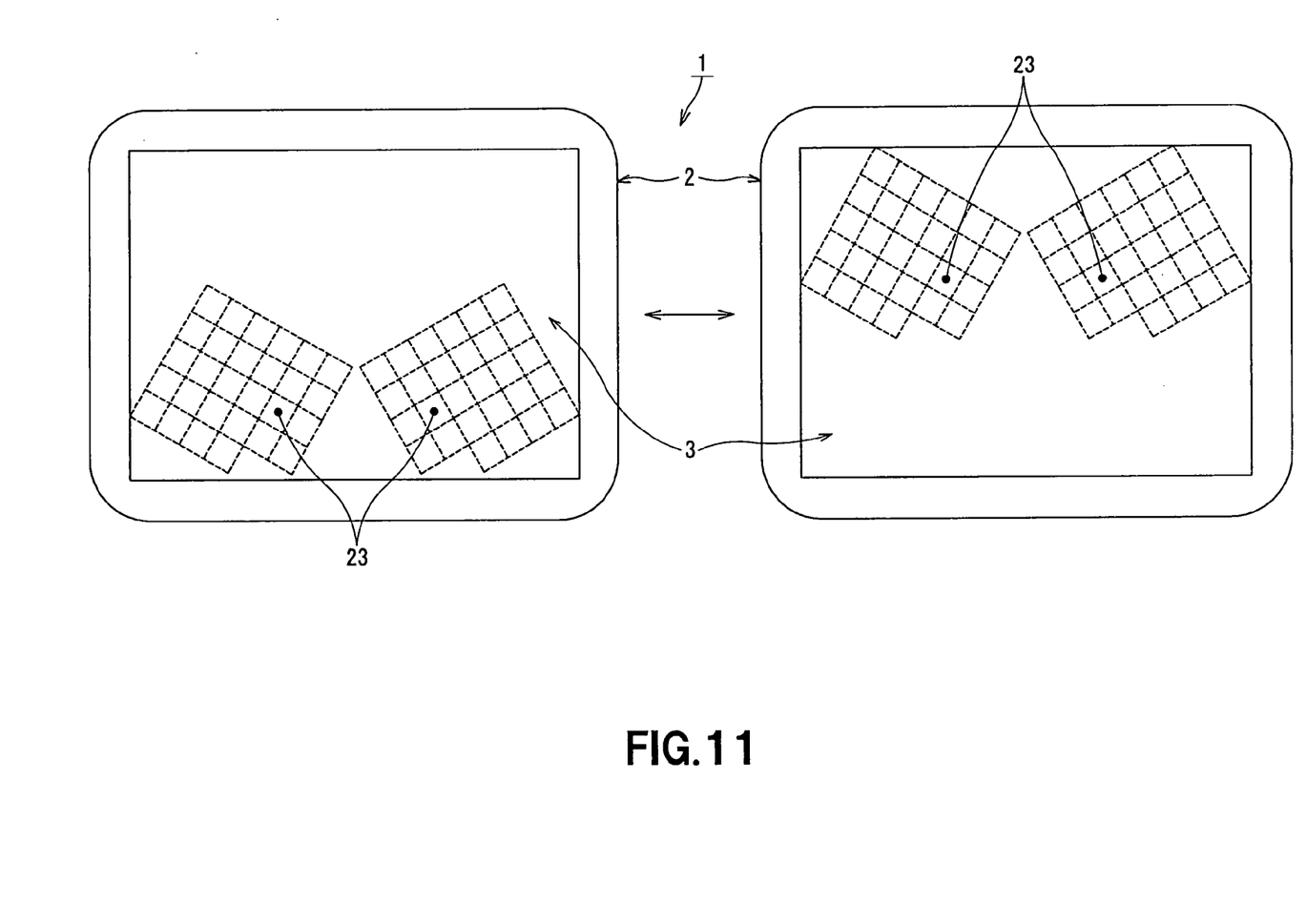
FIG. 11 is a plan view, showing how the positions of the groups of keys in the display are modified vertically.

Additionally, as shown in FIG. 10, the angle between the two groups of keys can be modified. Still additionally, the positions of the groups of keys can be modified vertically on the display screen as shown in FIG. 11.

Furthermore, it is also possible to finely adjust the key arrangement by taking the "user's peculiar propensity". For example, if pressure is detected at a position displaced from any of the keys of the software keyboard assigned to part of the pressure detection panel 4 for a predetermined number of times, the intervals separating the keys are modified to accommodate the displacement. With this arrangement, the frequency of mistyping is reduced to improve the input efficiency without forcing the user to recognize the mistyping.

The present invention is by no means limited to the above described embodiment, which may be modified in various different ways without departing from the scope of the present invention. For example, the key arrangement of the software keyboard may be that of a 101-key keyboard, a 104-key keyboard, a 106-key keyboard, a 109-key keyboard, the QWERTY arrangement or the DVORAK arrangement or a key arrangement that the user wants. Additionally, the user can freely define the key assignment of the software keyboard. Thus, the convenience and the input efficiency of the software keyboard will be remarkably improved. It is also possible to redefine mechanical buttons and switches from the GUI by way of the display 3 and the pressure detection panel 4 except the volume control button and the start button.

The information processing device 1 may be provided with a general purpose interface for connecting the device 1 to external equipment wirelessly or by way of wires. Then, the information processing device 1 can be used as display unit and input unit of the external equipment to improve the interfacing capability of the external equipment.

Additionally, the information processing device 1 may be provided with a TV tuner circuit, a removable recording medium and/or a communication modem. Since the information processing device 1 of the present invention can adapt itself to different modes of display operation and those of input operation, it can advantageously find applications in the field of GUI for Internet-related devices, interactive TV sets and bidirectional communication devices.

INDUSTRIAL APPLICABILITY

In an information display/input device according to the invention, virtual input keys to be used for inputting characters are assigned to part of the pressure detection means for key arrangement and only markers indicating reference positions of the virtual input keys on the display means by the display input control means. Thus, the device can improve the input efficiency without obstructing the information being displayed on the screen and reduce the load of operation on the part of the user.

The user can shift the position for assigning virtual input keys, make them visible or invisible and/or alter the key size according to the gap separating the markers and also the intervals of the keys for display/input control. Thus, the device can further improve the input efficiency and reduce the load of operation on the part of the user.

When a mechanical keyboard is provided, a signal conversion means is provided to convert the input signal from the mechanical keyboard and the input signal from the virtual input keys into a common keyboard signal. Therefore, the designer, or the developer, of the application can enjoy the advantage of being uninfluenced by the difference of keyboard type.

With an information display/input method according to the invention, virtual input keys for inputting characters are assigned to part of the pressure detection means for key arrangement and only the markers that operate as reference positions of the virtual input keys are displayed on the display means. Thus, the device can improve the input efficiency without obstructing the information being displayed on the screen and reduce the load of operation on the part of the user.

The user can shift the position for assigning virtual input keys, make them visible or invisible and/or alter the key size according to the gap separating the markers and also the intervals of the keys for display/input control. Thus, the device can further improve the input efficiency and reduce the load of input operation on the part of the user.

When a mechanical keyboard is provided, a signal conversion step is provided to convert the input signal from the mechanical keyboard and the input signal from the virtual input keys into a common keyboard signal. Therefore, the designer, or the developer, of the application can enjoy the advantage of being uninfluenced by the difference of keyboard type.

An information processing device according to the invention comprises a display/input section having a display means for displaying image information and/or character information and a pressure detection means arranged on the surface of the display means to detect the pressure applied to and the spot of pressure application on the display means, and a display/input control means for reflecting the signal detected by the pressure detection means to the selection of the image information being displayed on and/or the input of characters to the display means, the display/input control means being adapted to assign virtual input keys to be used to input characters to part of the pressure detection means for key arrangement and display only markers indicating reference positions of the virtual input keys on the display means. Thus, the input efficiency at the time of inputting data or the like is remarkably improved.

The invention claimed is:

1. An information display/input device comprising:
   display means for displaying image information and/or character information;
   pressure detection means arranged on the surface of the display means to detect the pressure applied to and the spot of pressure application on the display means; and
   display/input control means for reflecting the signal detected by the pressure detection means to the selection of the image information being displayed on and/or the input of characters to the display means;
   the display/input control means being adapted to assign virtual input keys to be used to input characters to part of the pressure detection means for key arrangement and display only markers indicating reference positions of the virtual input keys on the display means.

2. The device according to claim 1, wherein the display/input control means is adapted to alter the positions to which the virtual input keys are assigned according to the positions where the markers are being displayed.

3. The device according to claim 1, wherein, when pressure is not detected by the pressure detection means for a predetermined period of time, the display/input control means makes the virtual input keys translucent and visibly displays them.

4. The device according to claim 3, wherein, when pressure is detected continuously for a predetermined period of time on any of the virtual input keys, the display/input control means makes the virtual input keys invisible except the markers.

5. The device according to claim 1, wherein the display/input control means is adapted to assign the virtual input keys to the pressure detection means with dimensions corresponding to the gap separating the markers and alter the key size of the virtual input keys to make it similar to the marker intervals.

6. The device according to claim 1, further comprising:
   a mechanical keyboard; and
   signal conversion means being provided to convert the input signal from the mechanical keyboard and the input signal from the virtual input keys into a common keyboard signal.

7. An information display/input method for a graphic user interface for contact inputs to the display means of an information display/input device comprising display means for displaying image information and/or character information and pressure detection means arranged on the surface of the display means to detect the pressure applied to and the spot of pressure application on the display means, the method comprising:
   a display/input control step of reflecting a signal indicating the pressure and the spot pf pressure detected by the pressure detection means to the selection of the image information being displayed on and/or the input of characters to the display means;
   virtual input keys to be used to input characters being assigned to part of the pressure detection means for key arrangement and only markers indicating respective reference positions of the virtual input keys being displayed on the display means in the display/input control step.

8. The method according to claim 7, wherein the positions to which the virtual input keys are assigned are altered according to the positions where the markers are being displayed in the display/input control step.

9. The method according to claim 7, wherein, when pressure is not detected by the pressure detection means for a predetermined period of time, the virtual input keys are made translucent and visibly displayed in the display/input control step.

10. The method according to claim 9, wherein, when pressure is detected continuously for a predetermined period of time on any of the virtual input keys, the virtual input keys are made invisible except the markers in the display/input control step.

11. The method according to claim 7, wherein the virtual input keys are assigned to the pressure detection means with dimensions corresponding to the gap separating the markers and the key size of the virtual input keys are altered to make it similar to the marker intervals in the display/input control step.

12. The method according to claim 7, wherein
   the device further comprises a mechanical keyboard; and
   the method further comprising a signal conversion step of converting the input signal from the mechanical keyboard and the input signal from the virtual input keys into a common keyboard signal.

13. An information processing device comprising:
   a display/input section having display means for displaying image information and/or character information and pressure detection means arranged on the surface of the display means to detect the pressure applied to and the spot of pressure application on the display means; and
   display/input control means for reflecting a signal indicating the pressure and the spot of pressure detected by the pressure detection means to the selection of the image information being displayed on and/or the input of characters to the display means;
   the display/input control means assigning virtual input keys to be used to input characters to part of the pressure detection means for key arrangement and displaying only markers indicating respective reference positions of the virtual input keys on the display means.

* * * * *